Oct. 31, 1939.   J. GOERTZEN   2,178,169
BUTCHER BLOCK TREATING IMPLEMENT
Filed Nov. 13, 1937   3 Sheets-Sheet 1

Inventors
Julius Goertzen

By Clarence A. O'Brien
Hyman Berman
Attorneys

Oct. 31, 1939.  J. GOERTZEN  2,178,169
BUTCHER BLOCK TREATING IMPLEMENT
Filed Nov. 13, 1937   3 Sheets-Sheet 2
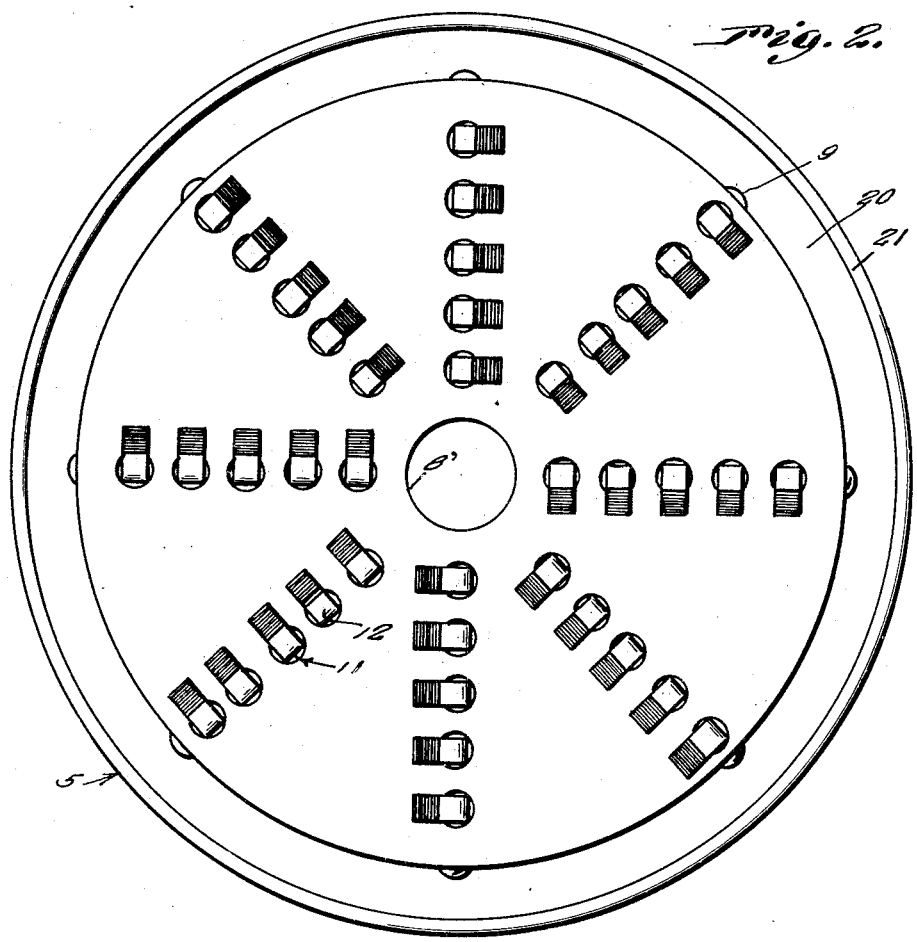
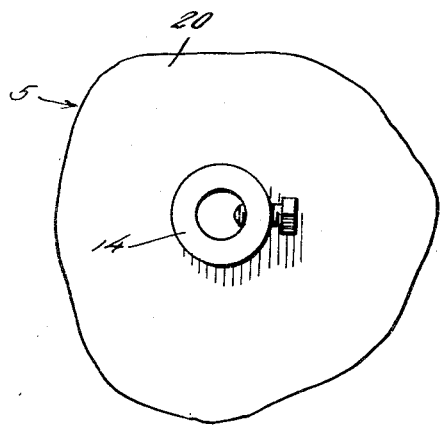
Inventors
Julius Goertzen
By Clarence A. O'Brien
Hyman Berman
Attorneys Oct. 31, 1939.    J. GOERTZEN    2,178,169
BUTCHER BLOCK TREATING IMPLEMENT
Filed Nov. 13, 1937    3 Sheets-Sheet 3
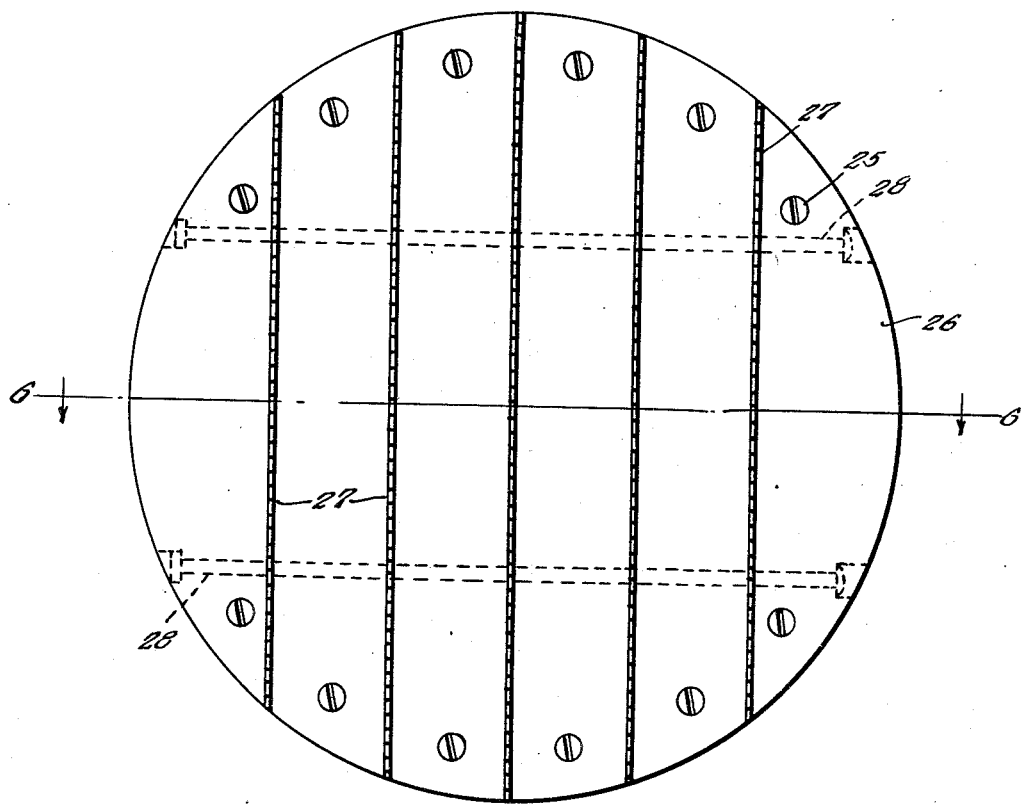
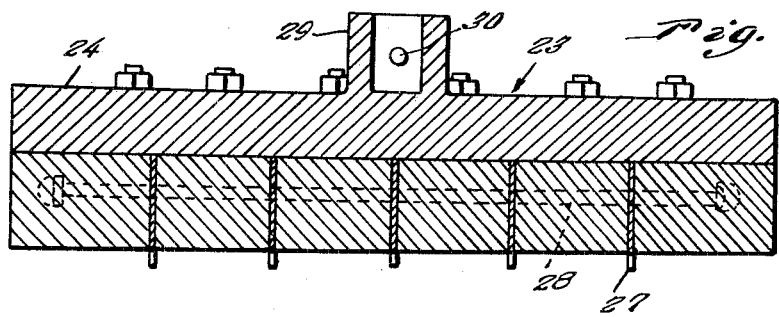
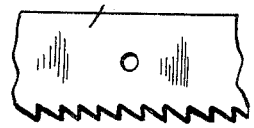
Inventor
Julius Goertzen Patented Oct. 31, 1939

2,178,169

UNITED STATES PATENT OFFICE 2,178,169

BUTCHER BLOCK TREATING IMPLEMENT

Julius Goertzen, Twin Falls, Idaho, assignor of one-half to Carl Siver, Twin Falls, Idaho Application November 13, 1937, Serial No. 174,457

1 Claim. (Cl. 144—115)

This invention appertains to new and useful improvements in means for treating the meat contacting surfaces of butcher blocks.

The principal object of the present invention is to provide an implement for scraping and dressing the surfaces of butcher blocks in an easier and more convenient manner than at present.

Another important object of the invention is to provide a motor driven butcher block treating implement which can be readily controlled and manipulated without inconvenience.

These and various other important objects and advantages of the invention will become apparent to the reader from the following specification:

In the drawings:

Figure 2 is a bottom plan view of the scraper.

Figure 3 is a top plan view of the rotary element of the scraper.

Figure 5 is a bottom plan view of the dresser.

Figure 6 is a section on line 6—6 of Figure 5.

Figure 7 is a fragmentary side elevational view of one of the dresser elements.

Figure 1:
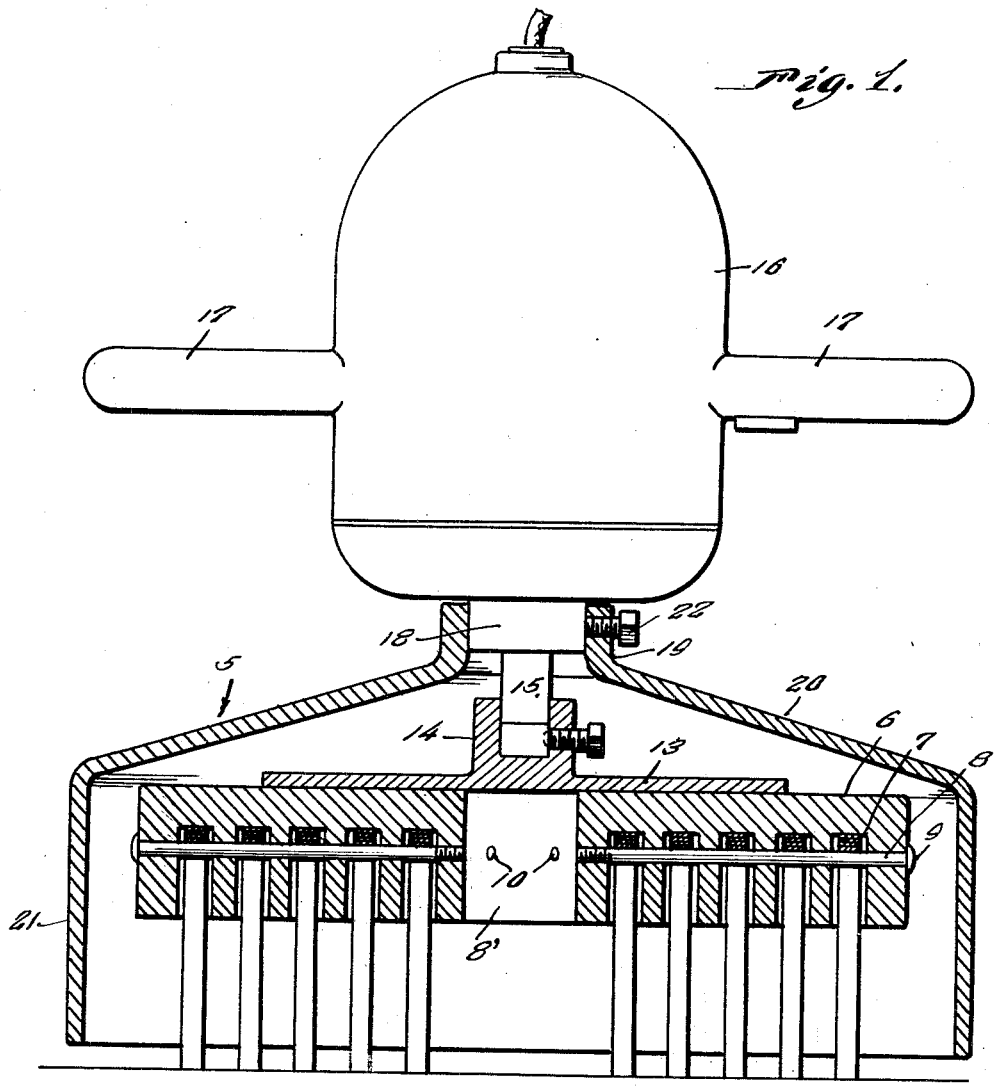
Figure 1 represents a vertical sectional view through the scraper.

Referring to the drawings wherein like numerals designate like parts, it can be seen in Figure 1 that the numeral 5 generally refers to the scraper which consists of the circular block 6 having rows of openings 7 therein radiating from the central opening 8'. These openings 7 are obliquely disposed and through each row of openings is disposed the pin 8, the latter having a head 9 at its outer end and threads at its inner end for threaded disposition into the central portion of the block 6 as at 10.

Figure 4:
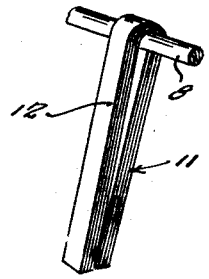
Figure 4 is a fragmentary perspective view of one of the scraping members.

The scraper members are generally referred to by numeral 11 and these consist of a plurality of spring members 12 which are bent back upon themselves in a substantially U-shape as shown in Figure 4 and inserted into the openings 7 as suggested in Figures 1 and 2, after which the pin 8 is inserted to pass through the bight portions of these U-formed spring members 12 for holding the same in the position shown in Figure 4 and in the slanting position shown in Figure 2.

Secured by screws or otherwise in the top side of the block 6 is the plate 13 having the socket structure 14 rising therefrom to receive the armature shaft of the electric motor 16, from the casing of which and projecting laterally in diametrically opposite positions are the handles 17—17. The case of the motor 16 is provided with the tubular extension 18 through which the armature shaft 15 extends and this extension 18 is disposed into the neck portion 19 of the hood 20 which hood is provided with a depending annular apron 21 extending down the side of the block 6 and being of such an extent as to be normally slightly spaced from the butcher block surface when the scraper elements 11 are treating the surface of the block. As a matter-of-fact, the hood can be pressed all the way down against the butcher block to pervent any escape of the block removed matter, from the confines of the hood.

A set screw 22 is disposed through the neck 19 and serves to bite against the tubular extension 18 to prevent displacement of the hood from the motor case.

In conjunction with this scraper a dresser device generally referred to by numeral 23 is employed and this consists of the block 24 of disk shape to the bottom side of which is secured by bolts 25 a multiplicity of strips 26 which serve to clamp the serrated blades 27 in place. In other words, these strips 26 serve to clamp the blades with their lower edges serrated in place against displacement from the block 23 and the tie bolts 28 pass transversely through these strips 26 and blades 27 to further prevent displacement of the blades.

Rising from the block 24 is the socket 29 having the set screw 30 whereby the same can be secured to the armature shaft 15. When the dresser 23 is to be used in conjunction with the motor 16, the hood 20 is dispensed with and the socket structure 29 is connected to the armature shaft 15.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

A device for treating a butcher's block comprising a disc-like head, a plurality of strips on one side of the head extending across said head in parallel side by side relation and including a pair of outermost segmental strips, and intermediate strips having curved ends and forming with said outermost strips a circular assembly of the same size as said head, a plurality of scraper blades interposed between said strips, respectively, and extending along the same with the ends thereof terminating at the edge of the assembly, bolts passing through said strips and blades for connecting the same together, and bolts passing through the head and strips for detachably connecting said strips to said head.

JULIUS GOERTZEN.